United States Patent

Crasnianski et al.

[11] 4,339,994
[45] Jul. 20, 1982

[54] MACHINE FOR STAMPING LICENSE PLATES

[75] Inventors: Serge Crasnianski, Meylan; Louis Soriano, Seyssinet Pariset, both of France

[73] Assignee: KIS France, Frenoble, France

[21] Appl. No.: 242,170

[22] Filed: Mar. 10, 1981

[30] Foreign Application Priority Data

Sep. 21, 1979 [FR] France .............................. 79 23563
Feb. 19, 1981 [EP] European Pat. Off. ......... 814200226

[51] Int. Cl.³ .............................................. B41F 1/07
[52] U.S. Cl. .......................................... 101/4; 72/433; 72/470
[58] Field of Search ........................ 101/4, 5, 6, 22, 33; 72/429, 433, 434, 444, 470; 100/210

[56] References Cited

U.S. PATENT DOCUMENTS

| | | | |
|---|---|---|---|
| 715,774 | 12/1902 | Fenner | 101/4 |
| 1,144,340 | 6/1915 | Campbell | 101/4 X |
| 1,709,002 | 4/1929 | Booth | 101/5 |
| 1,807,558 | 5/1931 | Sedwick | 101/4 |
| 2,441,862 | 5/1948 | Wutschen | 101/6 |
| 2,716,378 | 8/1955 | George | 101/6 |
| 3,339,481 | 9/1967 | Lang | 72/434 |
| 3,815,493 | 6/1974 | Broderick | 101/6 |
| 4,036,127 | 7/1977 | Speicher | 101/5 |

FOREIGN PATENT DOCUMENTS

| | | | |
|---|---|---|---|
| 122545 | 11/1946 | Australia | 72/434 |
| 2446904 | 4/1976 | Fed. Rep. of Germany | 101/4 |
| 2819257 | 11/1979 | Fed. Rep. of Germany | 101/6 |
| 139767 | 5/1930 | Switzerland | 101/4 |

*Primary Examiner*—E. H. Eickholt
*Attorney, Agent, or Firm*—Stevens, Davis, Miller & Mosher

[57] ABSTRACT

The present invention relates to a machine for automatically stamping license plates, in particular for automotive vehicles, comprising a motor and a flywheel solidly joined to the machine frame for the purpose of activating a stamping system with punch and die using a clutch system. The clutch system is a non-slipping rotary system formed by a cam mounted in idle on the motor shaft.

11 Claims, 4 Drawing Figures

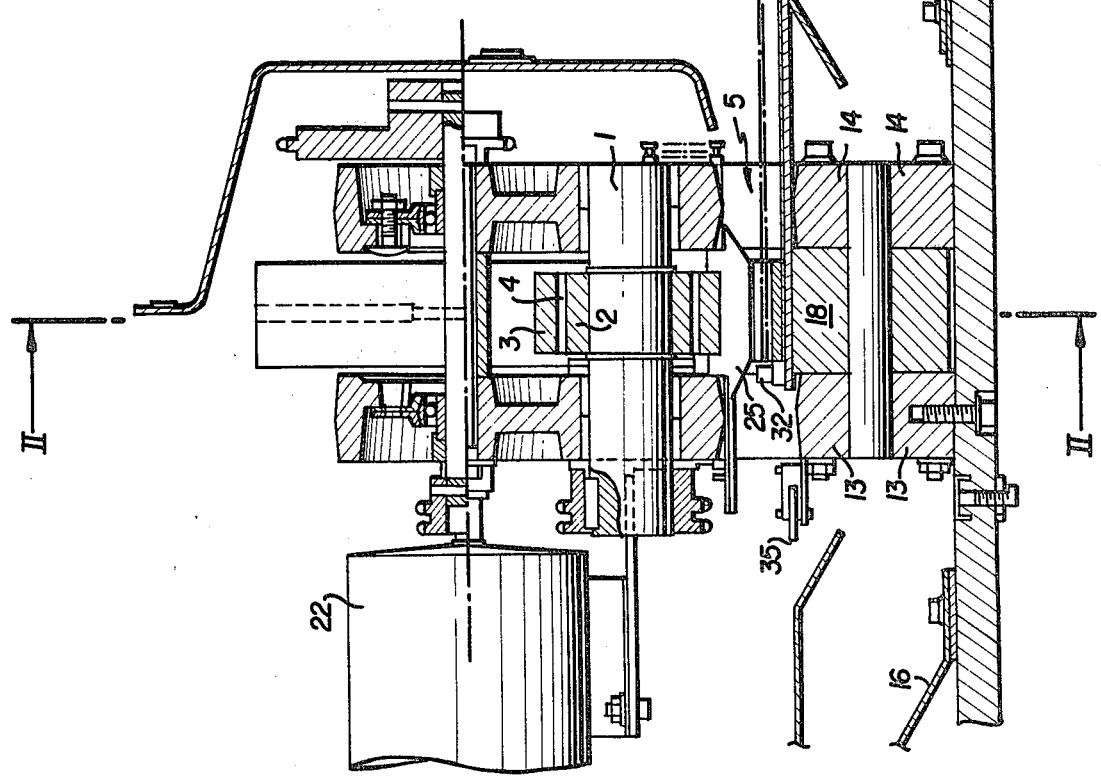

MACHINE FOR STAMPING LICENSE PLATES

BACKGROUND OF THE INVENTION

In commerce and industry, particularly that of the automobile, a large number of license-plate stamping machines already are known. Whether these be industrial machines to simultaneously emboss a set of characters, figures or letters, or small hand activated machines to emboss the characters one after the other in the plate, the implementing method is conventional and widely known in the art. Typically a blank thick aluminum plate is used, which is provided with a plating of thin Duralumin, for instance black, which will be placed between a punch and a die, the punch consisting of a small plate bearing the raised character, and the die holding the corresponding hollowed out character. Thereupon the die and the punch are compressed together, as a rule by applying a force of about 6000 daN to emboss one character. The punch being raised by an amount less than the thickness of the aluminum plate, the latter will be half cut-out, together with a deformation, whereby that side of the plate bearing the punch is endowed with a boss in the shape of the selected character. As the black Duralumin plating are sheared off and cleared from the aluminum plate, one obtains in this manner a bossed character of aluminum color on a black background.

Machinery is extant in industry with which several characters are simultaneously embossed. However, in addition to being bulky and heavy, they are also of high capital cost. Moreover small manual machines are known, which are lightweight, easily portable, compact and economical, in particular for use by small-scale shops or stores and resale agents of automobile articles who offer their clients license plates for immediate stamping. These suffer from the lack of automation and from the failure of rapid stamping of all the characters to go on the license plate.

The object of the present license plate stamping machine is to create a machine which is of low weight and low cost, and that operates quickly, reliably and automatically.

SUMMARY OF THE INVENTION

The basic idea of the invention rests on the fact that the material is only displaced by 1½ mm when a stamping force of 6,000 daN is applied to the characters. Consequently the work expended in stamping the characters is slight. Thus, the sequential stamping of the characters may be accomplished by a small machine, which stores the energy supplied by a small motor with a flywheel, this energy being released over a path of 1½ mm to actuate the die-and-punch stamping set, using an economical, non-slipping and simple clutch system in such a manner that the flywheel rotates continuously whereas the actuation of the stamping set is required only once per character, without any driving action taking place between two characters.

The invention is a machine of the above-cited type and uses a clutch system which is a non-slipping rotary system formed by a cam mounted in idle on the motor shaft. In the course of its rotation, the clutch system compresses the stamping set by an automatic locking means on said shaft. The cam of the clutch system consists of a race eccentric with respect to the shaft of the drive motor, and of an external race concentric with the eccentric race and mounted on the latter by roll means and capable of pressing by a jamming action against the stamping set. The eccentric race of the clutch system bears a stop catch retained by a hook solidly fixed to the machine frame and keeping the external ring of the clutch system in the position farthest from the hammer, which is actuated by an electromagnet.

In another feature of the invention, several stamping sets are arranged on a movable table provided with a step displacement means in a plane perpendicular to the displacement axis of the stamping hammer and to the plane of motion of the clutch system. Each stamping set bears one stud which activates a microswitch fixed to the machine frame and triggers the electromagnet moving the retaining hook of the stop catch of the eccentric race, while a timing system locks the movable table into position for the duration of one cycle of clutch-engagement and stamping, until the stop catch engages its retaining hook.

Other variations and features of the object of the invention will become clear in view of the description below, which is illustrative of only one embodiment of the invention.

BRIEF DESCRIPTION OF THE DRAWINGS

FIG. 3 is a cross-section of the machine of the invention along the line III—III of FIG. 2;

FIG. 4 is a sideview elevation of a detail of the hook and catch locking system of the cam of the system of FIGS. 1 and 3.

DETAILED DESCRIPTION OF THE PREFERRED EMBODIMENT

Figure 1:
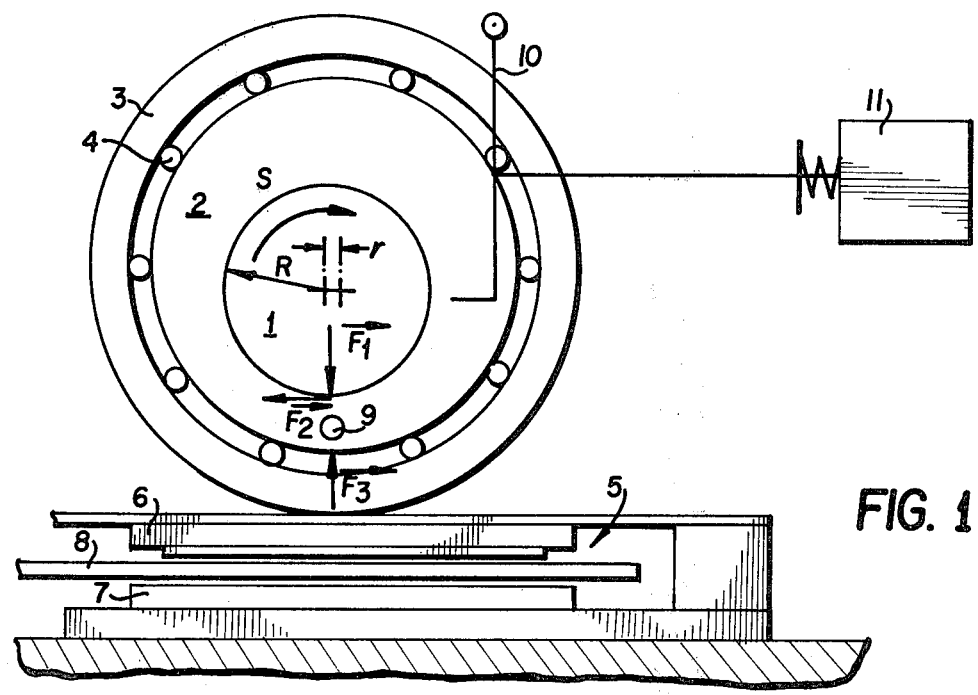
FIG. 1 is a schematic illustrating the design principle of the machine of the invention.

In FIG. 1, which is a schematic illustrating the design principles of the machine of the invention, the motor shaft 1 is shown supporting the non-slip rotary clutch system consisting of a cam mounted idle on the motor shaft 1 and consisting of an eccentric race 2 enclosing the shaft 1 and of an external race 3 concentric with the eccentric race 2 and mounted on latter by means of needle rollers 4 capable of pressing by jamming against a stamping set 5 consisting of a punch 6 and a die 7 which enclose a blank plate 8 which is to be numbered or similarly. The eccentric race 2 moreover bear a stop catch 9 retained by a hook 10 actuated by an electromagnet 11.

The operational principles of this machine presently will be explained in detail.

As the drive shaft 1 is rotating continuously, the catch 9 fixed to the eccentric race 2 is retained by the hook 10 and this race—which is mounted idle on the shaft 1—then will be in its high position, that is, in the position where it is farthest away from the stamping set 5. When the electromagnet 11 receives an electric pulse, the hook 10 lets go the catch 9 and the frictional forces resulting from the contact between shaft 1 and the race 2 drive latter into rotation until the external race 3 makes contact with the upper part of the punch 6. The machine is shown in this position in FIG. 1, which also shows the radius R of the drive shaft 1, the distance of eccentricity r of the race 2 axis to the axis of the shaft 1, and the forces $F_1$, $F_2$ and $F_3$ that are then exerted. A discussion of these forces is found below.

The motor torque acts on the eccentric race in jamming fashion, and at a given time, that is, at a fixed and always identical angular position, the external race 3 will make contact with the upper part of the punch 6. Thereupon the tangential friction force $F_2$ will act on the circular interface between the shaft 1 and the race 2 and directed in the direction shown in the figure, causing the set to be driven and clamped by a "jamming effect". As a result there is a radial force $F_1$ and a reaction force $F_3$ to it, so that the force $F_2$ increases, and so forth, causing quickly an increasing pressure on the punch performing the embossing, the jamming action ceasing at the end of one revolution, when the external race 3 leaves the punch, leaving the eccentric race 2 ultimately retained in the high position 2 (end of a stamping cycle). The force $F_2$ is given by $$F_2 = F_1 \tan \phi$$

where $\tan \phi$ is the coefficient of friction between the drive shaft and the eccentric race. The condition of operation is that the drive torque generated by the force $F_2$ exceeds the opposing torque generated by the force $F_3$.

Now, the motor torque $C_m$ is given by $$C_m = F_2 R, \text{ hence}$$

$$C_m = F_1 \tan \phi . R$$

and the opposing torque is given by $$C_r = F_3 r + F_3 f D$$

where f is the friction coefficient of the needle bearing.

The condition for operation is started by the fact that $C_m$ must exceed $C_r$, i.e., $$F_1 R \tan \phi > F_3 r + F_3 f D, \text{ or again}$$

$$\tan \phi > [F_3 r + F_3 f D]/(F_1 R)$$

when $F_3 = F_1$ $$\tan \phi > [r + f D]/R.$$

Now it is known that the value of $\tan \phi$ for the steel/-steel contact is $0.18 < \tan \phi < 0.35$. Consequently, if the shaft 1 and the eccentric race 2 are made of steel and if the following values are assumed:
r—1.5 mm;
R—20 mm;
f=0.005 max. and
D=30 mm, ps the condition for operation is $\tan \phi > 0.08$, which is the case for the inequality above.

Figure 2:
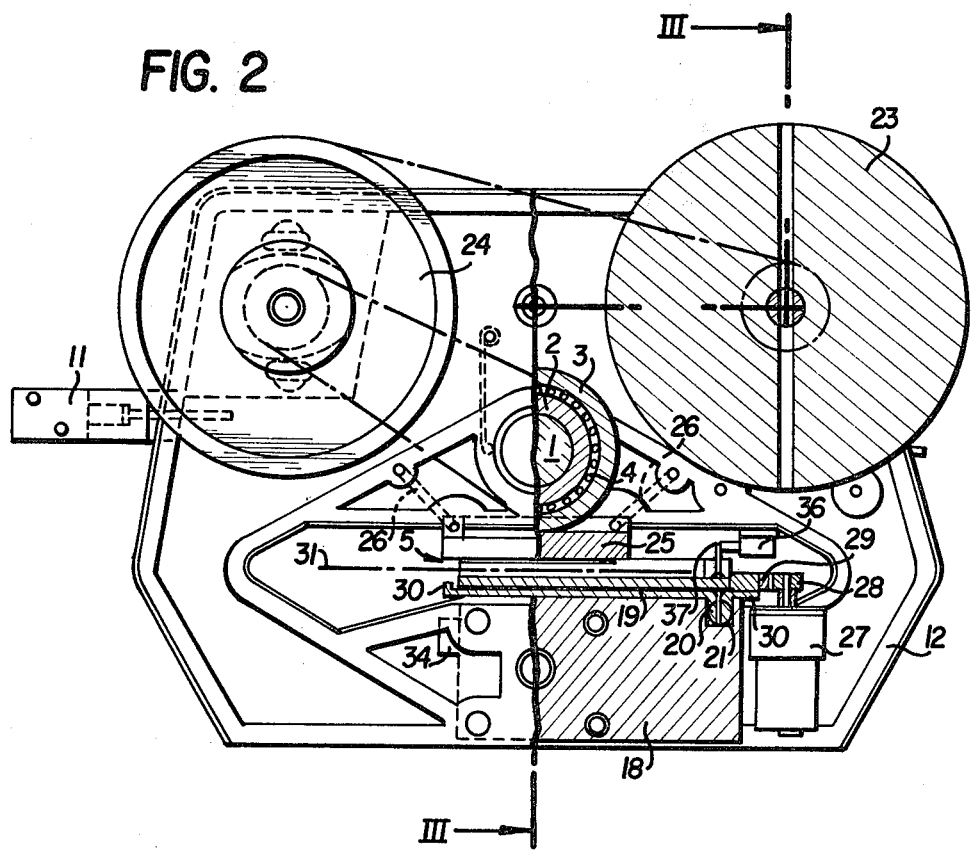
FIG. 2 is a lengthwise section of the machine of the invention along line II—II of FIG. 3.

Presently there follows a detailed description of the machine of the invention in relation to FIGS. 2 and 3. In these figures, the elements corresponding to those shown in FIG. 1 are referenced by the same numerals.

The stamping machine consists of a frame 12 formed by two side-slabs 13,14 of which the lower ends are joined to a base 15, between two side supports 16,17, and which between them clamp a spacer means 18 kept in fixed position on which a table 19 may move transversely, the lower side of this table comprises a lengthwise guidance bar 20 penetrating a lengthwise groove 21 fashioned in the fixed spacer means 18. The upper part of the frame, that is the upper parts of the two side slabs 13,14 supports a drive shaft 1 connected to a drive motor 22 by a flywheel 23 and by a conventional reducing drive means 24, for instance chains, belts or an intermediary shaft. A clutch system formed by a cam consisting of an eccentric race 2 and an external race 3 concentric to race 2 is mounted in idle manner on the shaft 1, which is horizontal and parallel to the movable table 19; race 3 is so mounted that it can roll on the circumference of race 2 by means of a needle bearing 4.

Furthermore, the upper part of the frame 12 comprises a stamping hammer 25 capable of sliding vertically in this part of the frame, below said clutch system. This hammer is elastically held against a stop means (not shown) which is fixed to the side slabs 13,14 by four tension springs 26, whereby there remains a play preferably of about 0.3 mm between said stamping hammer and the circumference of the outer race 3 when the latter is in its "high" position.

As shown in FIG. 4, the external race 3 of the clutch system can be locked in its high position by a retaining hook 10 connected to an electromagnet 11, in which a stop catch 9 supported by the race 3 can be locked.

Moreover, the lower part of the frame comprises a motor 27 of which the shaft bears a pinion 28 meshing with a geared rack 29 mounted on one of the longitudinal sides of the movable table 19 in such a way that this table can be driven in gliding manner on the component 18 and the side supports 16,17. Also, the movable table 19 consists of a plate of which the upper side bears a magnetic coating and is surrounded by a rim 30, so that the stamping sets 5 may be arranged thereon with sideways adjustment; these stamping sets 5 consist each of a punch 6 and a die 7, both conventional, of rectangular plates, which are joined elastically to one another and preferably made of steel, and can perfectly adhere to the movable table 19. These stamping sets are arranged on the movable table 19 if needed by using shims of mutually adjusted widths as regards the particular license plates of automobiles. Obviously, the distance between the lower end of the stamping hammer 25—which will be applied against the upper side of the punches—and the upper end of the component 18, which is solidly fixed to the frame, shall be so selected that stamping sets 5, which are arranged one next to the other and inside of which the blank plate to be licensed, 31, is located, can move underneath said hammer without excessive friction. Further, the movable table 19, at its ends and on its longitudinal axis, supports studs 32,33 on which the future license plate 31 will fix itself by means of corresponding holes with which it is supplied, said plate being placed upside down on the dies 7 of the stamping sets.

Lastly, the machine of the invention comprises several microswitches or electric breakers, allowing automatic operation control during the entire stamping of license plate characters. For instance a microswitch 34 of the caster type and fixed sideways to the lower part of the frame 12 is provided, which is mounted in the median longitudinal plane of the machine, on that side of the frame which is opposite the motor 27, so that when the movable table with the stamping sets 5 and the plate 31 is in place, its lower side shall at a given time actuate the switch 34. The frame 12 also bears a limit switch 35 to limit the excursion of the movable table 19 and to reverse the direction of its displacement to return it into its initial position, furthermore a microswitch 36 actuated by a stud 37 which is borne at one end of each stamping set 5. Lastly another microswitch 38 (FIG. 4) is provided, to control the electromagnet 11 activating the hook 10 and permitting to commence the stamping of the various characters of a blank license plate 31.

The electrical control and supply circuit for the motors and the switches may be conventional and known per se, and therefore is omitted; it will be noted however that it includes a timing system to lock the movable table 31 in position for the entire duration of a character stamping cycle and then triggers the table advance to the next character.

The machine operates as follows during the entire operation of license plate stamping: at the beginning, the motor 22 is rotating permanently and drives the shaft 1, while the hook 10 keeps the catch 9 of race 3 locked, said race thus being kept in the high position; the motor 27 rotates slowly, so as to facilitate meshing of the pinion 28/race 29 set when same is placed on the movable table 19 which is provided with the plate 31 and the stamping sets 5. When this meshing takes place properly, the underneath part of the movable table 19 touches the microswitch 34, as a result of which the motor 27 is stopped; the movable table then also is stopped. Next a button to begin the stamping operation is activated, so that the motor 27 is set into rotation at normal speed. It moves the movable table accordingly to the left (FIG. 3), this table holding the stamping sets 5 (only one being shown in the figure). When the stud 37 of this set 5 touches the microswitch 36, that is, when the set 5, and hence the character to be embossed, is in the proper position below the stamping hammer 25, said microswitch stops the motor 27 for a predetermined duration of the timing scheme (omitted) which corresponds to the duration of the clutch-engaged/stamping sequence. The actuation of the microswitch 36 by the stud 37 simultaneously actuates the electromagnet 11 which pulls back the hook 10, so that the catch 9 is freed. The eccentric race 2, which then is released, under the effect of the steel/steel friction between it and the shaft 1 will then rotate in the direction of the arrow 5 (FIG. 1), and as shown in this figure, then drives the external race 3 which will force itself against the upper side of the stamping hammer 25, which in turn will compress the upper side of the punch 6. In conformity with the principle indicated in FIG. 1, a clutch-engaging operation will take place when the eccentric race 2, which is idle on the shaft 1, is driven by the latter and is temporarily ganged to it, without slippage, on account of the jamming effect to which the system of race2/needles 4/race 3 is subjected as already described. Thereupon the stamping operation proper takes place on account of the lowering of the hammer 25, causing the embossing of the character in place whereupon, after a given angle of rotation of shaft 1, the jamming stress ceases and the shaft 1 continues driving the eccentric system 2-4-3 due to mere steel/steel friction of 2 on 1, until the stop catch 9 is locked by the retaining hook 10, which easily overcomes such force. It is after a period which includes this time interval that the timing system starts the motor 27 again, which then drives the movable table 19 as far as the position for the next character, and so on until contact is made with the limit switch 35, whereby the reversal of the displacement of the table as far as its return to its initial position is achieved, that is, until the table is totally out of the machine again.

It will be noted that on account of the inherent design of the clutch system of the drive shaft 1 (the system of the eccentric race 2, needle rollers 4, external race 3), the clutch-action is performed automatically without the load being permanently applied. This is so because at start, the load will be null. It is gradually applied over about half a rotation of the shaft and next is null for the rest of the revolution. In addition, the angular position at the beginning of the effective clutch-engagement is constant and wholly determinate, and, taking into account the relative dimensions of the components 1,2,3,4 and the selection of the relative materials, there is perfect assurance of the condition of operation—without slippage.

It is self-evident that the preceding description was provided in merely illustrative manner and that other embodiment variations of the machine of the invention may be considered without thereby leaving its scope.

We claim:

1. An automatic license plate stamping machine, comprising:
   a frame;
   a drive shaft mounted on the frame;
   a motor connected to the drive shaft;
   a set of punch and die stamping means; and
   a clutch system connecting the drive shaft to the punch and die stamping means, said clutch system comprising:
   a rotary system formed by a cam race mounted idle on the drive shaft and compressing the die stamping means in the course of its rotation due to its automatic locking onto the shaft.

2. The machine as defined in claim 1, wherein the cam race of the clutch system consists of an inner race eccentric with respect to the axis of the drive shaft; and of an external race concentric with the inner race and mounted on the inner race by roll means, the external race being capable of pressing with locking action against the set of die stamping means.

3. The machine as defined in claim 2, further comprising:
   a stamping hammer mounted in sliding manner into the frame, between the external race of the clutch system and the set of punching means, there existing a slight play between said stamping hammer and the external race when said external race is in a position which is farthest from the stamping hammer; and
   a plurality of tension springs symmetrically arranged with respect to the axis of displacement of the stamping hammer, said plurality of tension springs retaining the stamping hammer in the frame in a position closest to the clutch system.

4. The machine as defined in claim 3, further comprising:
   a reducing transmission system; and
   a fly wheel, said fly wheel and the reducing transmission system connecting the drive shaft which drives and supports the clutch system to the motor.

5. The machine as defined in claim 4, further comprising:
   a stop catch borne on the inner race;
   a hook which retains the stop catch, said hook being ganged to the frame which keeps the external race in a position farthest from the stamping hammer; and
   an electromagnet which actuates the hook.

6. The machine as defined in claim 5, further comprising:
   a movable table which can be displaced in a step by step motion in a plane perpendicular to the axis of displacement of the stamping hammer and to the plane of operation of the clutch system, said movable table having a plurality of the set of die stamping means arranged thereon.

7. The machine as defined in claim 6, wherein each die stamping means bears a stud which actuates a first microswitch fixed onto the frame for triggering the electromagnet.

8. The machine as defined in claim 7, further comprising:
- a second microswitch actuated by the underside of the movable table during its emplacement on the frame; and
- a limit switch bounding the course of the movable table and reversing its direction of displacement.

9. The machine as defined in claim 8, further comprising:
- a timing system which locks the movable table in position during one clutching and stamping cycle until the stop catch is engaged in the hook.

10. The machine as defined in claim 9, wherein
- each stamping means is kept in position on the movable table by a framing means which encloses the movable table due to magnetic adhesion;
- each die stamping means is provided with a steel die support plate and the movable table is covered with a magnetic rubber means; and
- the movable table bears two upwardly pointing fastening lugs allowing the suspension of a license plate on the movable table between the set of punch and die stamping means.

11. The machine as defined in claim 10, wherein the movable table is guided on the frame by a guidance bar sliding in a groove of the upper side of the frame.

* * * * *